(12) United States Patent
Maurer

(10) Patent No.: US 6,922,663 B1
(45) Date of Patent: Jul. 26, 2005

(54) INTELLIGENT WORKSTATION SIMULATION-CLIENT VIRTUALIZATION

(75) Inventor: Max M. Maurer, Gardiner, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/517,465

(22) Filed: Mar. 2, 2000

(51) Int. Cl.⁷ .............. G06F 17/50; G06F 7/62; G06F 15/177; G06F 15/173
(52) U.S. Cl. .............. 703/13; 709/224; 709/223; 709/220
(58) Field of Search .............. 703/13; 709/220, 709/223, 224, 241, 238, 203

(56) References Cited

U.S. PATENT DOCUMENTS

| | | | |
|---|---|---|---|
| 4,855,999 A | | 8/1989 | Chao |
| 5,309,437 A | | 5/1994 | Perlman et al. |
| 5,440,719 A | | 8/1995 | Hanes et al. |
| 5,541,922 A | | 7/1996 | Pyhalammi |
| 5,600,637 A | | 2/1997 | Kikuta |
| 5,600,798 A | | 2/1997 | Cherukuri et al. |
| 5,621,726 A | | 4/1997 | Murakimi |
| 5,671,224 A | | 9/1997 | Pyhalammi et al. |
| 5,732,213 A | | 3/1998 | Gessel et al. |
| 5,748,634 A | | 5/1998 | Sokol et al. |
| 5,761,486 A | | 6/1998 | Watanabe et al. |
| 5,794,128 A | * | 8/1998 | Brockel et al. .......... 455/67.11 |
| 5,802,285 A | | 9/1998 | Hirviniemi |
| 5,822,563 A | | 10/1998 | Sitbon et al. |
| 5,881,237 A | | 3/1999 | Schwaller et al. |
| 5,881,269 A | * | 3/1999 | Dobbelstein ................ 703/21 |
| 5,892,763 A | | 4/1999 | Laraqui et al. |
| 5,996,016 A | * | 11/1999 | Thalheimer et al. ........ 709/227 |
| 6,002,671 A | * | 12/1999 | Kahkoska et al. .......... 370/248 |
| 6,041,063 A | * | 3/2000 | Povlsen et al. ........ 370/395.53 |
| 6,295,557 B1 | * | 9/2001 | Foss et al. .................. 709/224 |
| 6,314,531 B1 | * | 11/2001 | Kram .......................... 714/38 |
| 6,530,078 B1 | * | 3/2003 | Shmid et al. ............... 717/138 |
| 6,631,137 B1 | * | 10/2003 | Lorrain et al. .............. 370/401 |

* cited by examiner

Primary Examiner—Kevin J. Teska
Assistant Examiner—Dwin M. Craig
(74) Attorney, Agent, or Firm—Scully, Scott Murphy & Presser; William A. Kinnaman, Jr. Esq.

(57) ABSTRACT

A network client simulation tool that virtualizes multiple clients from a single network entity. The simulation tool builds LAN frames of protocol stack level 2, which represent data originating from multiple clients to simulate traffic from multiple clients. It also provides a method for inserting the level 2 LAN frames built onto a physical LAN for actual delivery to a system being tested for simulating real client LAN traffic environment. LAN frames in the present invention are inserted at level 2, data link layer of a protocol stack by employing a novel split bridge which receives client requests and adds bridge routing information to emulate incoming multiple client requests having different client addresses.

16 Claims, 11 Drawing Sheets

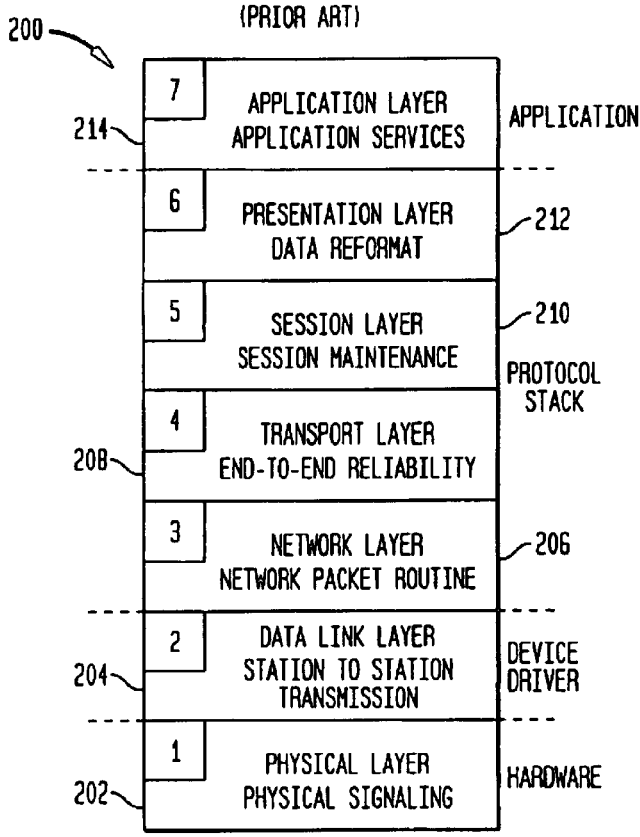
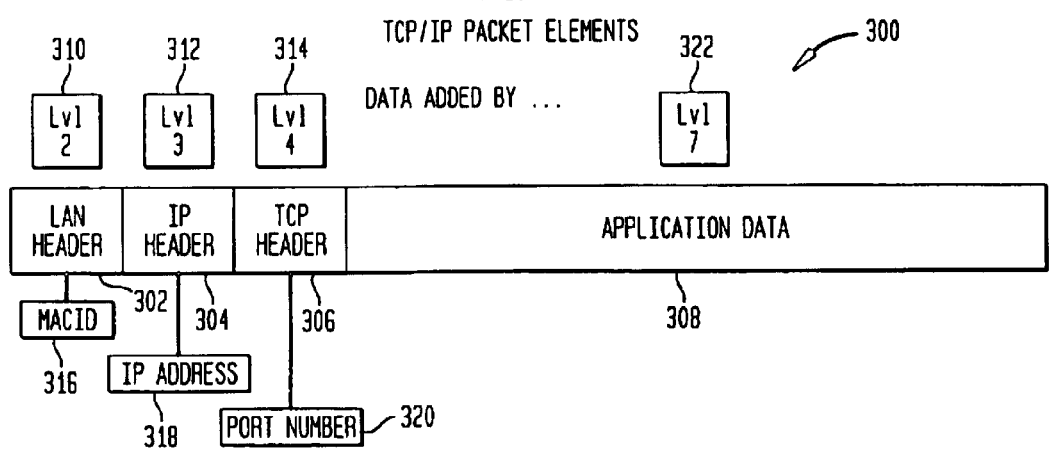

INTELLIGENT WORKSTATION SIMULATION-CLIENT VIRTUALIZATION

CROSS-REFERENCE TO RELATED APPLICATIONS

This application is related to U.S. patent application Ser. No. 09/516,708, entitled "INTELLIGENT WORKSTATION SIMULATION-SIMULATION AT PROTOCOL STACK LEVEL 2" filed on Mar. 2, 2000, and U.S. patent application Ser. No. 09/517,534, entitled "INTELLIGENT WORKSTATION SIMULATION-LAN FRAME GENERALIZATION SIMULATION", filed on Mar. 2, 2000, both of which are incorporated herein in their entirety by reference thereto.

DESCRIPTION

1. Technical Field of the Invention

The present invention relates in general to intelligent workstation simulation, and more particularly to a method and system for generating local area network (LAN) frames and inserting the frames onto the LAN.

2. Background of the Invention

Computers and computer networks currently provide important advantages to enterprises and individuals in today's society. Moreover, with the advent and ensuing popularity of the Internet and the World Wide Web ("Web"), there is a tremendous increase in volume and usage of networked computer systems. Consequently, the explosive growth of computer networks has necessitated a need for larger servers to handle the network traffic. Presently, different implementation paradigms are available for handling this increase in volume. For example, some developers in the computer industry are implementing larger single servers to handle the network traffic while others are including a greater number of duplicated, relatively small servers to handle the increase in the network traffic volume.

Typically, as part of a development cycle, computer systems and software applications are tested by utilizing a simulation test tool, designed to emulate a real run time environment in order to test whether the specific computer system or application meets the various design criteria. In both of the above-described server implementations for meeting the high demand of network traffic, a complete and thorough test requires that the servicing computer, e.g., a server comprising a single machine or multiple machines, be tested at full load. Failure to execute a complete test inevitably results in a failure in the system when a full load is eventually experienced during the run-time.

Accordingly, to effectively test large and complex distributed applications and/or server applications, simulation of a realistically large client base is needed. Currently existing simulation tools provide simulation at application level. However, simulation at the application level yields an application specific simulator. Simulation at the port level is an improvement but still fails to exercise many client-specific paths in the system under test. Thus, a general purpose simulator that also seeks to provide a high fidelity simulation, for example, a simulation at level 2, the data link layer of the protocol stack is highly desirable. The data link layer is the lowest protocol stack level where each individual client has a unique client address.

Other simulators are currently available for testing computer networks to withstand a large volume of traffic. FIG. 1 is a diagram 100 illustrating a typical prior art simulation setup. The serving system, i.e., a system under test 102 is driven by a set of simulation driving systems, S 104. These driving systems 104 are controlled by a central machine, simulation controller 106. All of these machines share a common connection medium 108 such as a local area network or LAN. A plurality of such configurations may be present in order to achieve the total bandwidth necessary to drive the serving system. There may be multiple controlling systems or the controlling system may have connections to multiple LANS.

Typically, the existing prior art simulators fall into two broad categories: 1) keystroke stuffers; and 2) protocol exercisers. A "keystroke stuffer" utilizes the actual application on the driving client. The driving vehicle is a program which retrieves stored scripts of keystrokes, mouse movements, and/or other user inputs to provide input to the actual client application to drive the application. The application then directs the traffic through a client protocol stack to the system under test 102.

FIG. 2 is a diagram of the seven layer Open Systems Interconnection ("OSI") protocol stack model. Each of the layers represents a function that must be performed to effect communication between different machines. The lowest layer in the model is the physical layer 202. The functions within the physical layer 202 include setting up, maintaining, and deactivating physical circuits between systems. The most notable physical layer interfaces include IEEE 802.2 and IEEE 802.3. The next layer, i.e., layer 2, in the OSI model is the data link layer 204, which is responsible for transferring data over the physical circuits or the channel between systems. The functions of the data link layer 204 include dividing data into frames to transfer the frames to another system across the physical medium. The data link layer provides for the synchronization of data to delimit the flow of bits from the physical layer. The data link is a point-to-point link between two devices that are directly connected together.

The next layer, layer 3, is the network layer 206. The network layer 206 provides internetwork services such as the network routing and the communications between networks. The network layer 206 handles multiple point-to-point links in the case where frames are transmitted across multiple links to reach their destination. Internet Protocol ("IP") in the Transmission Control Protocol/Internet Protocol ("TCP/IP") suite is a network layer protocol.

The next layer, layer 4, is the transport layer 208. The transport layer 208 provides end-to-end accountability of data transmitted as streams of packets. The transport layer functions include monitoring data flow to ensure proper delivery of data between source and destination. It provides for error correction and for data fragmentation and reassembly. TCP is a protocol layer protocol.

The next layer up, layer 5, is the session layer 210. The session layer 210 provides for control and synchronization in exchanging data between users. For example, dialogues may be used for check and recovery of data transfer. The next layer up, layer 6, is the presentation layer 212. The presentation layer 212 functions include formatting data for display or presentation. In this layer, codes and encryption in data are interpreted and formatted for presentation. The next layer up, layer 7, is the application layer 214. This layer is responsible for supporting end-user applications such as file transfer, electronic message exchanges and terminal session.

Importantly, it should be understood that all levels of the above-described OSI layers are not necessarily present in all protocol stacks. That is, the OSI protocol stack is a reference model to provide standardized logical decomposition of network into layers for communications between systems. For example, TCP/IP does not have a complete level 4 in the protocol stack because IP does not guarantee delivery of data nor will it detect missing packets, although there is a reassembly function in TCP/IP that serves a portion of the function typically found at level 4. Instead, for TCP/IP, reliable delivery is left up to the driving application at level 7. Thus, a keystroke stuffer is, effectively, simulation above level 7, the application layer of the protocol stack.

A "protocol exerciser" provides a somewhat more efficient method for producing load. This method involves simulation at level 7 of the protocol stack. This type of simulator will have knowledge of a particular application, for example, the File Transfer Protocol ("FTP"). This simulator will open ports directly with the system under test rather than having the client application do so and drive traffic to the system under test by conforming to the higher level protocol that is being tested, e.g., FTP, Hypertext Transfer Protocol ("HTTP"), Open Database Connectivity ("ODBC"), Simple Mail Transfer Protocol ("SMTP"), etc. The protocol exerciser provides an efficient way to generate load because all extraneous functions of the application such as redrawing screens, etc., do not need to be performed at the client. A significant drawback of this type of load generation, however, is that this simulator is protocol specific. If a new protocol is developed, a new load generator needs to be developed. For example, an SMTP traffic generator cannot be used to test the Internet Mail Access Protocol ("IMAP") even though both protocols are mail transfer protocols. Instead, it is necessary to develop an IMAP protocol tester.

The result of either of these methods is a series of packets that pass between the system under test (102 FIG. 1) and the driving system (104 FIG. 1). FIG. 3 is a layout of a packet for a Transmission Control Protocol/Internet Protocol ("TCP/IP") transmission. This packet includes a series of headers 302, 304, 306 that have been prepended to the data 308 that the application desires to send. FIG. 3 also indicates the level 310, 312, 314 in the protocol stack where the data is added to the packet and the address 316, 318, 320 that applies to each level. The application data 308 from layer 7 is typically passed to the transport layer where, for example, TCP. As shown in FIG. 3, TCP adds a header 306, and passes it to next layer protocol 312, for example, IP. IP also adds its header 304 and passes it to the layer 2 protocol 310 which also adds its header 302. As shown, layer 2 protocol may be Ethernet, Token Ring, FDDI LAN. The padded data is then passed to the physical layer where the data is converted into electrical signals and transmitted to the destination system to be received by the network interface card on the destination system. In sum, a request from a user traverses the OSI model until it is converted into network traffic. Once it reaches the destination system, it moves back up the OSI model so that a server application may interpret the request.

FIG. 4 shows the layout of the LAN header 400. This is an IEEE 802.2 Token Ring header. The shaded "Source MACID" field 402 is the client address which is added at level 2. MACIDs are assigned by the manufacturer of the network interface card, and are unique to each card. FIG. 5 shows the layout of the IP header 500. The shaded "Source IP address" field 502 is the client address which is added at level 3. FIG. 6 shows the layout of the TCP header. The shaded "Source Port" field 602 allows the receiving host to route the data field to a specific application running on that client. The header formats shown in FIGS. 4, 5, and 6 are well known to those skilled in the art of computer networking. Note that the port numbers are not client unique. That is, given a port number, it is not possible to identify the unique client to which that port number belongs. Instead, port numbers are used to distinguish between various users within the client. In contrast, the MACID and IP addresses are client unique. Given either a MACID or an IP address, a unique client can be determined. Given this overview, it is possible to examine the traffic flows resulting from simulators of the current art, to compare these flows with traffic that would result from an equal number of actual clients, and to compare and contrast how these flows would affect the system under test.

The major difference between a prior art simulation tool and real client traffic is the degree of fidelity of the simulation. Generally, the phrase "test fidelity" refers to the property that a test properly exercises code paths, for example, to closely emulate the real runtime network load in a computer network. FIG. 7 shows a series of packets 700 that would originate from a prior art simulator where a single workstation was set up to simulate 100 clients. Generally, the prior art simulation method would open one hundred sessions with the system under test. This would result in one hundred packets being sent to the system under test. However, as illustrated in FIG. 7, the client specific addresses, MACID and IP address 702a . . . 702n, 704a . . . 704n, for each of these packets would all be identical. It is apparent to both the system under test and to anyone who might be tracing the traffic of these transactions that the test setup has a single workstation providing high volumes of traffic.

In contrast, FIG. 8 shows one hundred packets 800 produced by a real client set. Note that each packet has unique client-specific addresses for both the MACID and the IP address 802a . . . 802n, 804a . . . 804n. Thus, to the system under test, this appears to be one hundred clients, each with one application running. An example of how this departure from fidelity by the prior art simulators would be visible and how it would negatively impact the test that could be achieved is explained below.

Typically, the prior art simulators asserting that each driving workstation can simulate some number of client workstations do not physically emulate multiple number of different client workstations, but one client workstation. This can be verified by using a TCP/IP provided command. TCP/IP provides a simple command: "arp–a" which displays the Address Resolution Protocol ("ARP") table. ARP determines through the use of a broadcast message packet the MACID, a physical client address, that corresponds to a specific TCP/IP address, a protocol client address. This pair of addresses is then stored in the ARP table for future use to avoid future network traffic required for the discovery. There will be an entry in the ARP table for each workstation that communicates with a particular TCP/IP host. If this command were to be entered on the system under test, only a single entry would appear, i.e., that of the single workstation communicating with the server. In contrast, if one hundred real clients were present, the ARP table would have one hundred entries, one for each real client.

There are some cases where this distinction is not important. However, if, as an example, there were a bug in the ARP table handling code that only allowed 50 clients to be maintained, then the above test would certify this code as being good up to 100 clients while, once the code was released to customers and actually had to support 100 clients, the bug would become apparent and the code would fail. More insidiously, it would appear that the code had not been tested since the error would appear very quickly in the real environment. Thus, the example test provided by the prior art simulators provides flawed test emulation because it does not provide a realistic testing environment.

The test is flawed because the tool used to drive the test does not provide high fidelity to the real client environment. Specifically, the prior art simulator does not exercise all possible paths in the code implementing the system under test that the real client set exercises.

An additional disadvantage concerns the network traffic. In the above case, the ARP table is populated with the single entry for a driving workstation. This ARP table population requires a flow of data on the network. The result of this flow yields the ARP table entry. In a real configuration, however, there would have to be multiple flows of network information, one to each of the real clients. Thus, in the prior art simulated environment, ARP would be under represented in the network traffic flows. This would be doubly true as ARP tables have a specific size and entries tend to fall out of this table as they age. In the prior art simulated scenario, this would never occur as traffic for multiple clients is flowing to the single real workstation. In a real environment, this would happen all the time. Thus, once again, the network load simulated under the prior art simulation is different than it is in production. This, once again, leaves code paths that are either not tested at all or that are under tested in the prior art simulated environment and any flaws in these code paths can and will cause failures in production that will not show up in test.

The scenarios where the above-described failures occur can be generalized. Specifically, if the code being tested incurs any per-client costs and/or maintains state information on a per-client basis, then high fidelity testing is required if the code paths that support those per-client items are to be sufficiently tested. FIG. 9 illustrates this concept. The prior art simulators operate in area 1 902 providing a small number of clients each of which produces a high bandwidth. Real clients, on the other hand, operate in the mirror reverse. Real clients operate in area 2 904, i.e., a large number of clients each of which produces a relatively small bandwidth of data. Thus, while a simulator in the prior art provides the total aggregate bandwidth required by the system under test, the type of this bandwidth is incorrect in that it does not represent a correct number of clients. Testing which has this flaw will show the characteristic that in-lab testing will complete without error but, upon experiencing load in a production environment, the server will fail.

Generally, the above described behavior is prominent in the services that are provided on the Internet today. Referring back to FIG. 9, if the number of clients is small, areas 1 902 and 2 904 overlap as shown at 906. Thus, either sort of test may be sufficient. However, as the total bandwidth grows, it is extremely important to ensure that the testing adjusts to the growth correctly. As an example, it is clear that if a company production level doubles in size it is unrealistic to expect that each worker suddenly doubles their workload. Instead, it is more reasonable to expect that the number of workers doubles. Thus, growth typically occurs along the "X" axis 908 of the graph in FIG. 9 rather than along the "Y" axis 910. That is, as Internet usage grows, areas 1 902 and 2 904 become increasingly distant from one another. This distance represents potential failures that cannot be detected by the existing prior art simulators.

The prior art simulators generally run on the machine types that they are simulating. i.e. if an Intel 80×86 machine is being simulated, the simulation generally runs on an 80×86 machine. If an IBM S/390 machine is being simulated, the simulator generally runs on a S/390 machine. This is true because current art simulators depend upon either the applications being run in the simulated platform and/or on the client protocol stack of the simulated platform.

Considering the foregoing, it is highly desirable to have a network simulator that is able to emulate more realistic client/server network traffic and load for testing a system under test. Particularly, it is highly desirable to have a network simulation system that is able to emulate realistically large number of clients. It is also highly desirable to have this simulation system to run on any computer system, independent of specific architecture.

Problems arise in simulating multiple clients from a single entity utilizing one network card because the physical LAN entities are designed for a single client, and therefore, have hardware addresses unique to each LAN card which are used for addressing and identifying the single client. Typically these hardware addresses are designated by a unique medium access control identifier ("MACID") assigned to each LAN card at the manufacturer. In network computing, the MACID identifies the specific client that originates the traffic so that the LAN entity, the server contacted can reply and effect a two-way conversation. Thus, it is also highly desirable to have a simulator be able to emulate multiple clients originating traffic while only utilizing a single physical network card. Moreover, it is highly desirable to have this simulator emulating multiple clients to also be able to emanate and absorb traffic as individual clients.

SUMMARY OF THE INVENTION

It is an object of the present invention to provide a network client simulation tool and simulation methodology to facilitate high fidelity simulation a level 2 of the protocol stack. Particularly, the network client simulation tool that virtualizes multiple clients from a single network entity, by building network, e.g., LAN, frames at protocol stack level 2, to represent data originating from multiple clients to simulate traffic from the multiple clients. The client simulation tool implements a method for inserting the level 2 network LAN frames onto the LAN destined for actual delivery to a system under test, and retrieving LAN frames from the LAN that were generated by the system under test destined for delivery to the multiple clients.

Additionally, the client simulation tool of the present invention includes a single physical LAN device (e.g., a network card) that both emanates and absorbs traffic for multiple simulated clients in a predictable and reliable manner. The frame insertion method of the present invention provides reliable and architecturally sound method of enabling a return path through which the other side of the conversation, i.e., a system under test, can reply. These replies include interactive frames such as session connect information returned to the simulator of the present invention. The simulator may then check the reply or response frames.

Thus according to a first aspect of the present invention, there is provided a simulator for inserting simulated network frames onto a physical medium for delivery to a system under test over a network, the simulator comprising: a split bridge device having a network interface card for to communicating to a network via said network interface card; a frame generator coupled to the split bridge device for generating one or more simulated network frames according to a specific network communications protocol, the split bridge device transferring one or more simulated network frames between the frame generator and the network and routing said one or more simulated network frames based on a unique identifier combined with bridge routing information associated with the one or more simulated network frames.

Thus according to a second aspect of the invention, there is provided a simulator enabling insertion of simulated network frames onto a physical medium for delivery to a system under test implementing one or more servers to achieve load balancing across a network, the simulator comprising: a plurality of split bridges each having a network interface card, each of said plurality of split bridges connected to a respective one of the one or more servers employed for load balancing and enabled to communicate via a respective network interface card to the network; a primary split bridge responsive to a broadcast message received via the network interface card immediately responding thereto, and a secondary split bridge responsive to the broadcast message received via the network interface card for delaying a response for a predetermined amount of time, wherein subsequent messages are sent only to the primary split bridge of said plurality of split.

Further features and advantages of the present invention as well as the structure and operation of various embodiments of the present invention are described in detail below with reference to the accompanying drawings. In the drawings, like reference numbers indicate identical or functionally similar elements.

BRIEF DESCRIPTION OF THE DRAWINGS

Preferred embodiments of the present invention will now be described, by way of example only, with reference to the accompanying drawings in which:

FIG. 2 is a diagram of the seven layer OSI protocol stack showing the basic functions of each layer;

FIG. 3 is the layout of a TCP/IP packet;

DETAILED DESCRIPTION OF THE PREFERRED EMBODIMENT OF THE INVENTION

Figure 1:
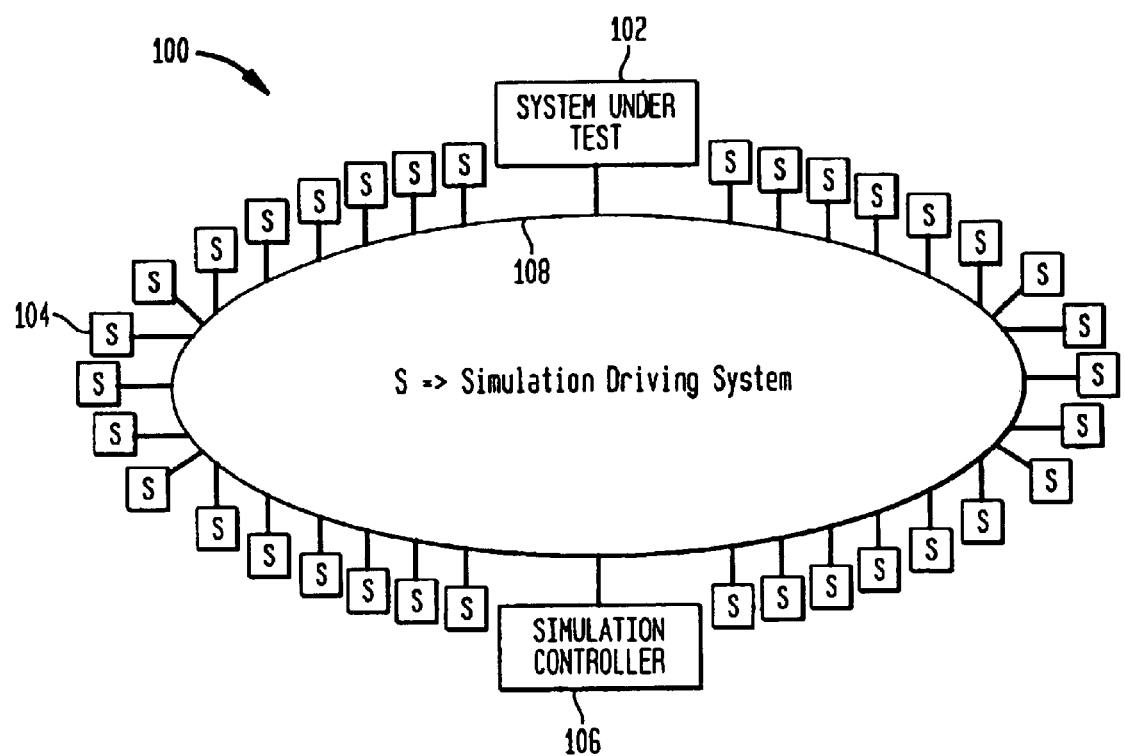
FIG. 1 is a diagram of a typical simulator in the prior art.
Figure 4:
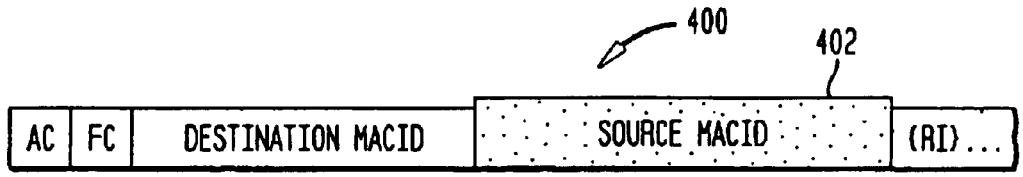
FIG. 4 shows the layout of the LAN header, IEEEE 802.2 Token Ring.
Figure 5:
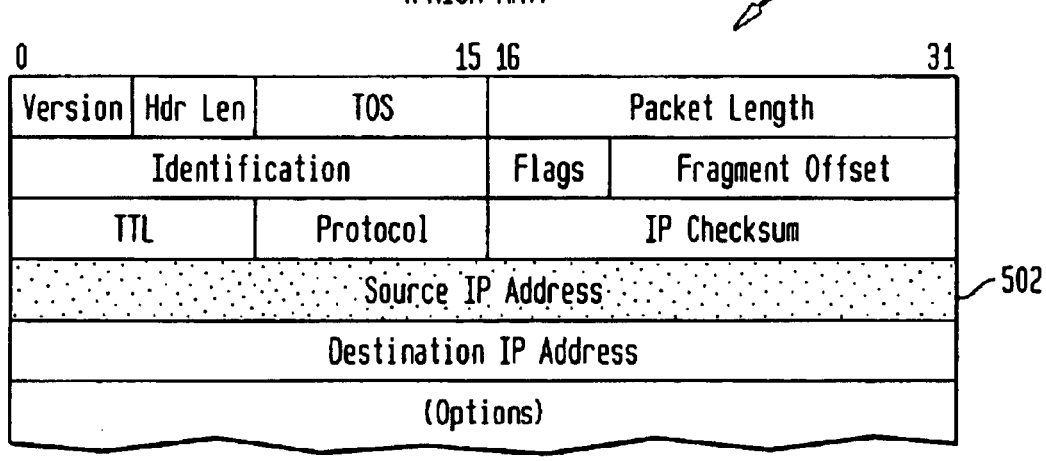
FIG. 5 shows the layout of the IP header.
Figure 6:
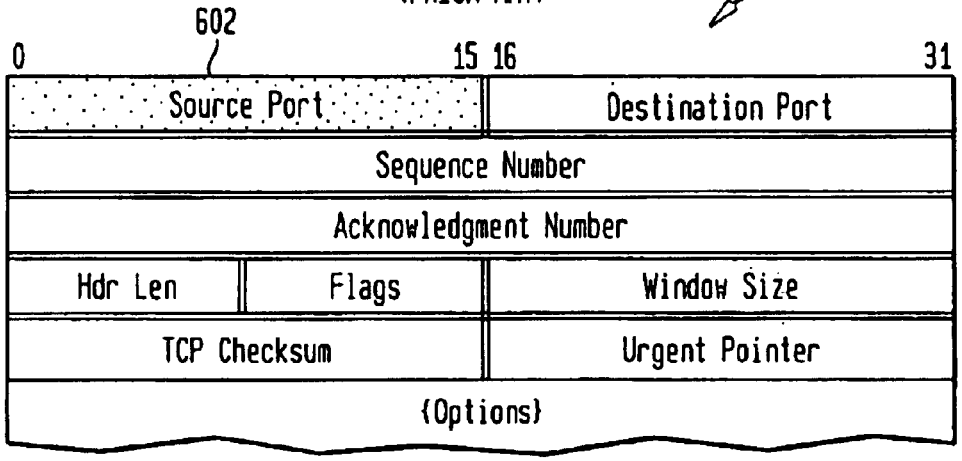
FIG. 6 shows the layout of the TCP header.
Figure 7:
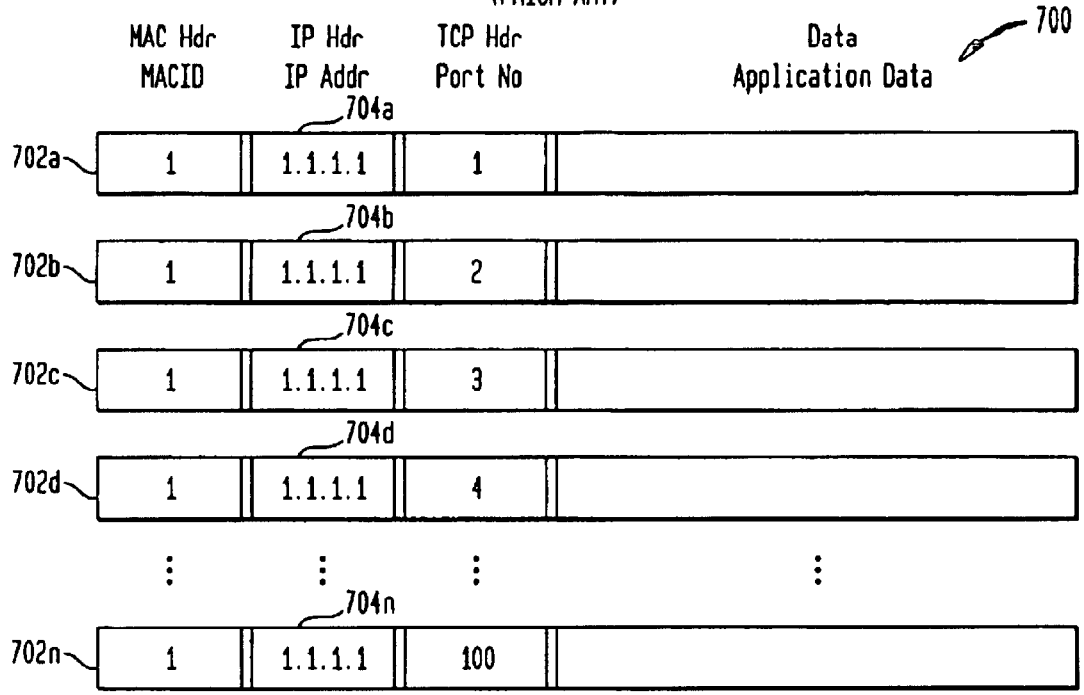
FIG. 7 shows packets from 100 simulated clients produced by a simulator of the current art.
Figure 8:
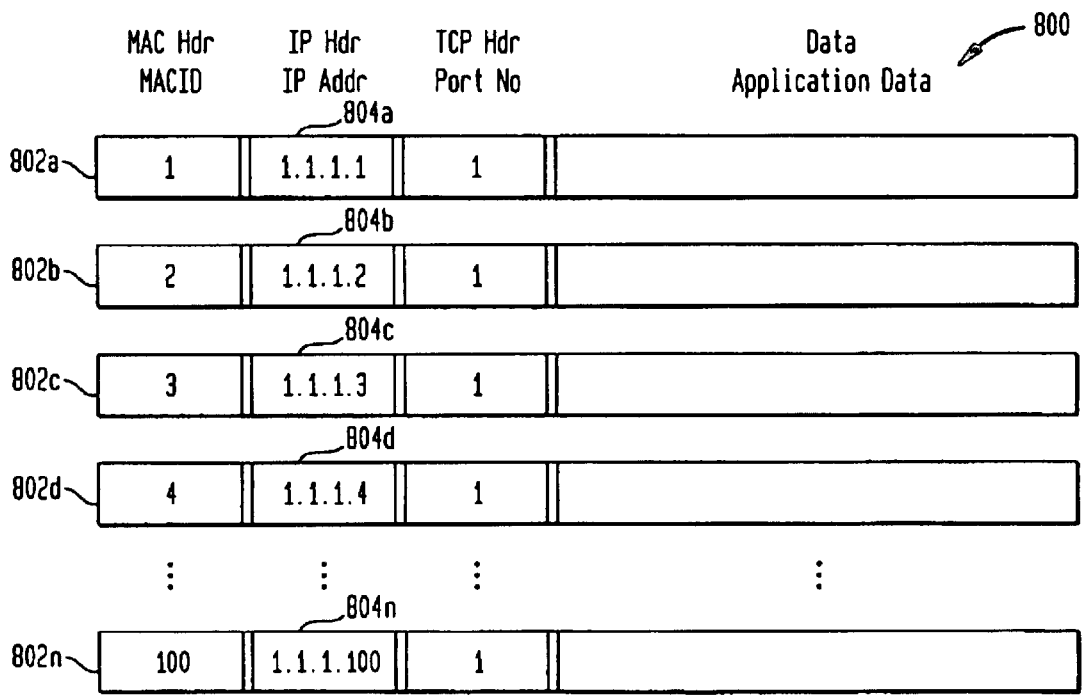
FIG. 8 shows packets from 100 real clients or from 100 clients simulated by this invention.
Figure 9:
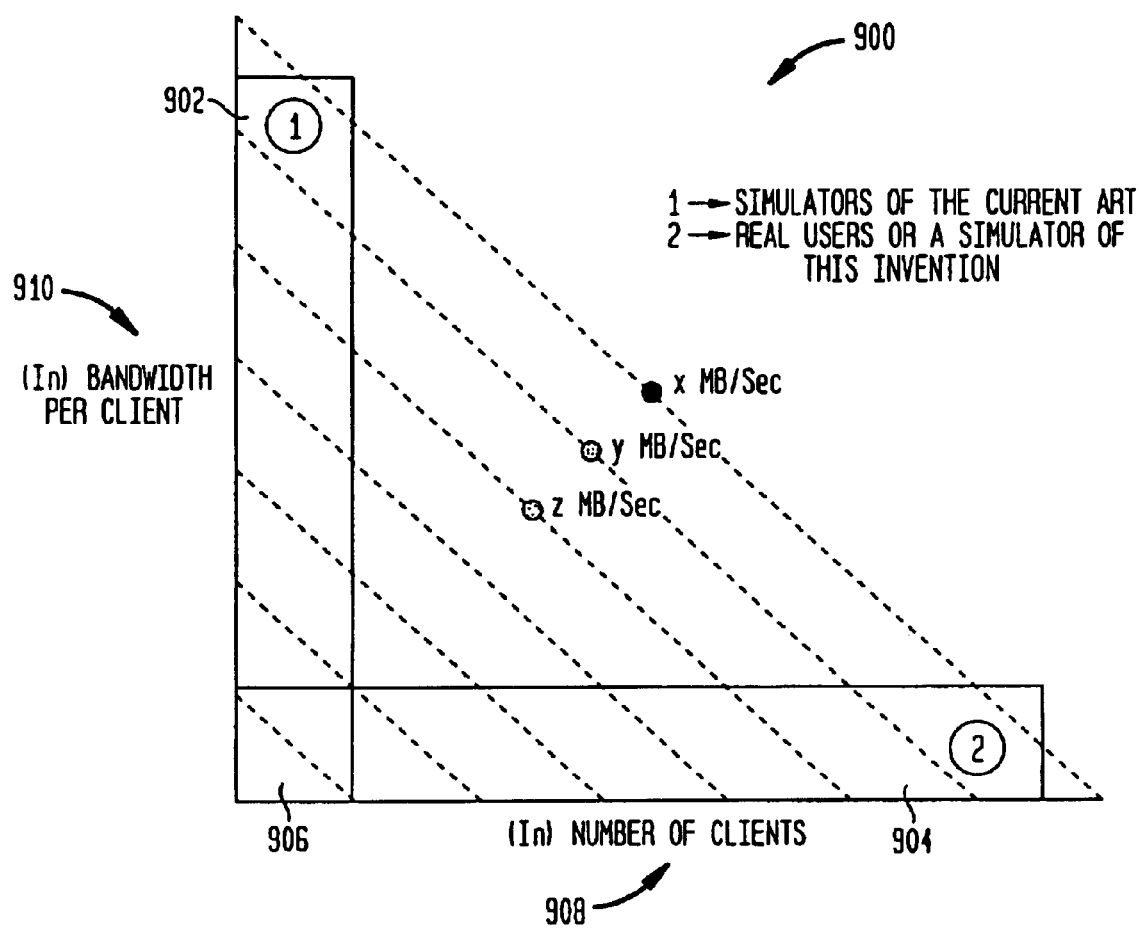
FIG. 9 shows a graph of two distinct methods of operation for reaching a desired aggregate bandwidth at the system under test.

The present invention is directed to one component of a generalized client/server network simulation tool that simulates network traffic that is indistinguishable from the traffic generated by a plurality of real clients. The simulation tool may be employed to test host, for example, S/390, based network serving software and hardware. However, because of the generalized nature of the simulation, the scope of this tool is not limited to host testing nor to software testing. Moreover, the simulation tool of the present invention may be utilized to test the network fabric, i.e., the physical layer of the protocol stack.

To accomplish the foregoing high level of simulation fidelity, that is, a simulation closely resembling real client network paths, the network simulation tool includes: 1) simulation at level 2 in the protocol stack; 2) simulation that builds complete LAN frames; and 3) a component that enables insertion and retrieval of traffic for multiple clients. Each of the three components will be described briefly hereinbelow. The present invention is directed to the third component of the simulation tool that enables a single simulating system to originate LAN frames for multiple virtual clients and insert them onto the LAN destined for delivery to a system under test, and retrieve LAN frames from the LAN that were generated by the system under test destined for delivery to the multiple virtual clients originated by the simulating system.

1) Simulation at Level 2 in the Protocol Stack

In a typical network computing environment, each client is equipped with an identifier unique to the client. This identity is unique down through level 2, the media access control or MAC layer. Specifically, each client has a unique MACID, the address that the client's LAN card recognizes in order to capture physical traffic from the LAN. To correctly simulate the real computer networking environment, the simulation tool of the present invention provides simulated clients having unique identities at level 2.

Alternatively, each client also has a unique identity at level 3, the network layer of the protocol stack. Specifically, for TCP/IP, this is the IP address for the client. Furthermore, some applications tend to receive traffic at different levels depending upon their scope. For instance, a mail server, which primarily serves users that are local to the enterprise and, thus, local to the LAN, tends to receive traffic at level 2. Each LAN frame will have a unique MACID and a unique TCP/IP address that corresponds to the MACID. Other applications, such as Web servers, primarily serve users that are foreign to the enterprise, and thus, not attached to the LAN but who have come into the LAN through a router attached to a wide area network. These servers tend to receive traffic at level 3, i.e., each LAN frame has a unique TCP/IP address that corresponds to the client but the MACID is the same in all of the frames, the MACID of the router.

To provide high fidelity simulation, the simulation tool of the present invention operates at level 2 to provide a simulation of locally attached clients. However, simulation at level 3 can also be achieved by setting duplicate MACIDS, to provide a simulation of remotely attached clients.

2) Simulation Generating Complete LAN Frames

This component relates to the generation of LAN frames for the simulated clients and is described in greater detail in commonly-owned, co-pending U.S. patent application Ser. No. 09/516,708. Level 2 is where the complete LAN frame is built just prior to transmission on the physical LAN which is level 1. Because the client identity reaches level 2 in the protocol stack, any simulator that demonstrates a high degree of fidelity must be able to generate complete LAN frames. That is, knowledge of which specific client is being simulated must pervade the protocol stack through level 2, the building of the LAN frame. A serving entity is a finite state machine, i.e., a complete transaction usually takes more than one communication. For example, in a home shopping transaction, multiple communications related to a purchase takes place between a client and the server. Building the LAN frames at level 2 in accordance with the system described in U.S. patent application Ser. No. 09/517,534 enables simulation of actions of the application that would be running on the simulated client maintaining the client portion of this finite state machine. Further, building LAN frames at level 2 allows retrieval and manipulation of the contents of each reply from the server as state information, thereby enabling full checking of responses from the host.

3) Simulation that Inserts and Retrieves Traffic for Multiple Clients

Once the LAN frames are generated as herein above described, the frames need to be inserted on the LAN. That is, the LAN frames built at level 2 now enter level 1, the physical protocol stack for transmission. Since LAN cards generally do not check to ensure that the addresses supplied in LAN frames that are to be inserted onto the LAN are correct, it is possible to generate traffic for multiple clients and send it out. At other levels, such insertion is called "spoofing", i.e., pretending to be someone else. However, the real problem arises when the server returns traffic to the simulated client. The LAN card only recognizes traffic specifically for the client identity that has been specified to the card. Thus, in normal circumstances, traffic for multiple clients goes out but cannot come back in.

To circumvent this problem, the third component of the simulation tool employs novel methods, which are architecture specific, for example, specific to Token Ring, or Ethernet. Moreover, the methods also may be generalized to cover all LAN types.

Thus, the present invention is directed to a component of a network simulator which virtualizes clients, i.e., enables seamless insertion of the simulated LAN frames onto a physical medium such as the LAN, so that they can then be actually delivered to a system under test just as real client LAN traffic would be delivered, and enables retrieval of LAN frames from the LAN so that they can be delivered to the emulated clients.

In a preferred embodiment, the present invention employs a split bridge for LAN types that support bridges, to effect client virtualization.

Figure 10:
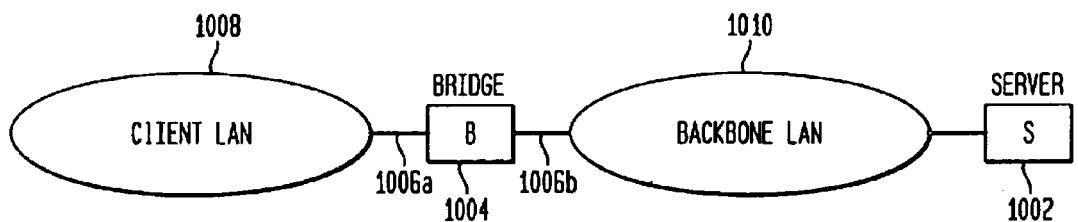
FIG. 10 is a diagram illustrating a normal bridge operation.

Generally, a bridge is a physical network entity, e.g., a LAN entity, that emanates and absorbs traffic to and from multiple clients. However, simply utilizing a bridge is not sufficient since this device simply transfers the traffic from one LAN segment to another. FIG. 10 is a diagram illustrating a normal prior art bridge operation. The bridge is a network connection device with two or more ports 1006a, 1006b that forwards data frames from one network segment to another, thus joining two or more network segments together. Bridging takes place in the data link layer, i.e., layer 2, of the protocol stack. In a normal bridge operation, the server 1002 can see the bridge 1004. The bridge 1004 emanates traffic for all of the clients at a client LAN 1008, and absorbs the return traffic. As shown in FIG. 10, the bridge 1004 transfers data between the two LANs, client LAN 1008 and backbone LAN 1010. Bridges build address tables that describe routes of arriving packets forwarded by the bridge. Arriving packets are thus forwarded based on the entries the bridge has in its table.

Physically, a bridge is a personal computer ("PC") with two network interfaces (i.e., network cards) each for transferring network traffic from one interface to another with monitoring and filtering. However, the split bridge, which is implemented to provide client virtualization according to the present invention, involves the splitting of the bridge in LAN architectures that support bridging, such as Token Ring and FDDI, into two interfaces: a first interface configured as a conventional bridge device; and a second interface comprising software or microcode for driving the bridge device to function as an input/output device driver, under the control of the utilizing application. The purpose of this duality is to cause the LAN device to accept traffic from a plurality of virtual clients.

It is to be understood by one skilled in the art, that a similar system may be implemented in networks, which support switches for connecting networks, such as the ATM. Thus, a switch device may be split to provide the aforementioned dual interfaces for these types networks. Hereinafter, the description refers to a bridge or a switch as a LAN device.

Figure 11:
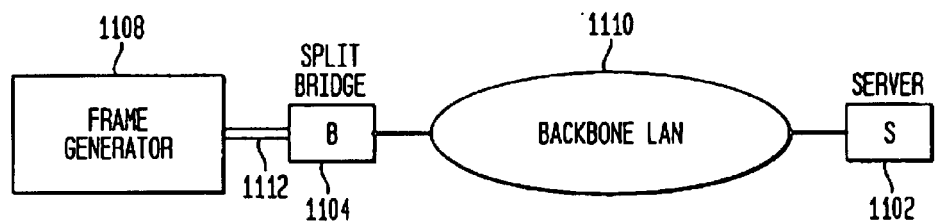
FIG. 11 illustrates a diagram exemplifying a split bridge operation of the present invention.

FIG. 11 illustrates a diagram exemplifying the split bridge operation implemented in accordance with the principles of the present invention. As shown in FIG. 11, the split bridge device 1104 provides a first interface with the backbone LAN 1110 and a second interface comprising a Microchannel Mainframe Connection (MMC) 1112 to the Frame Generator (simulating machine) 1108. By replacing the bridge 1004 in FIG. 10 with a split bridge 1104 of FIG. 11, the present invention enables traffic to be inserted onto the backbone LAN 1110. In this case, the clients are architecturally addressed not by MACID alone but MACID combined with bridge routing information. In typical LAN architecture, such as the Token Ring, the client must discover the hardware address of the server derived from some protocol specific address such as an IP address or a network basic input output system ("NETBIOS") name. In order to learn the hardware address, the client broadcasts a message asking the server to reply with its hardware address. Bridges, upon receiving such a frame, add bridging information to the frame and forward the frame on the other leg of the bridge. In this way, in effect, the bridge is adding to the client address the bridge route information. Upon receiving the client request for a hardware address, the server broadcasts a reply to the client. Subsequent reply/request communications and non-broadcast messages between the client and the server are then routed through the network in the same way, as the client and the server remember the route. It is this routing information that is used by the split bridge to receive traffic on the backbone LAN 1110. Once the data is inside the split bridge, the data is passed to the simulating machine intact (Frame generator). All manipulations of the data is performed by the simulating machine. Similarly, on outbound, data passed from the simulating machine is placed unchanged on the backbone LAN 1110. Broadcast LAN frames are an exception to this handling. The split bridge (like all bridges) adds routing information for the bridge itself as it passes the data in either direction.

Figure 15:
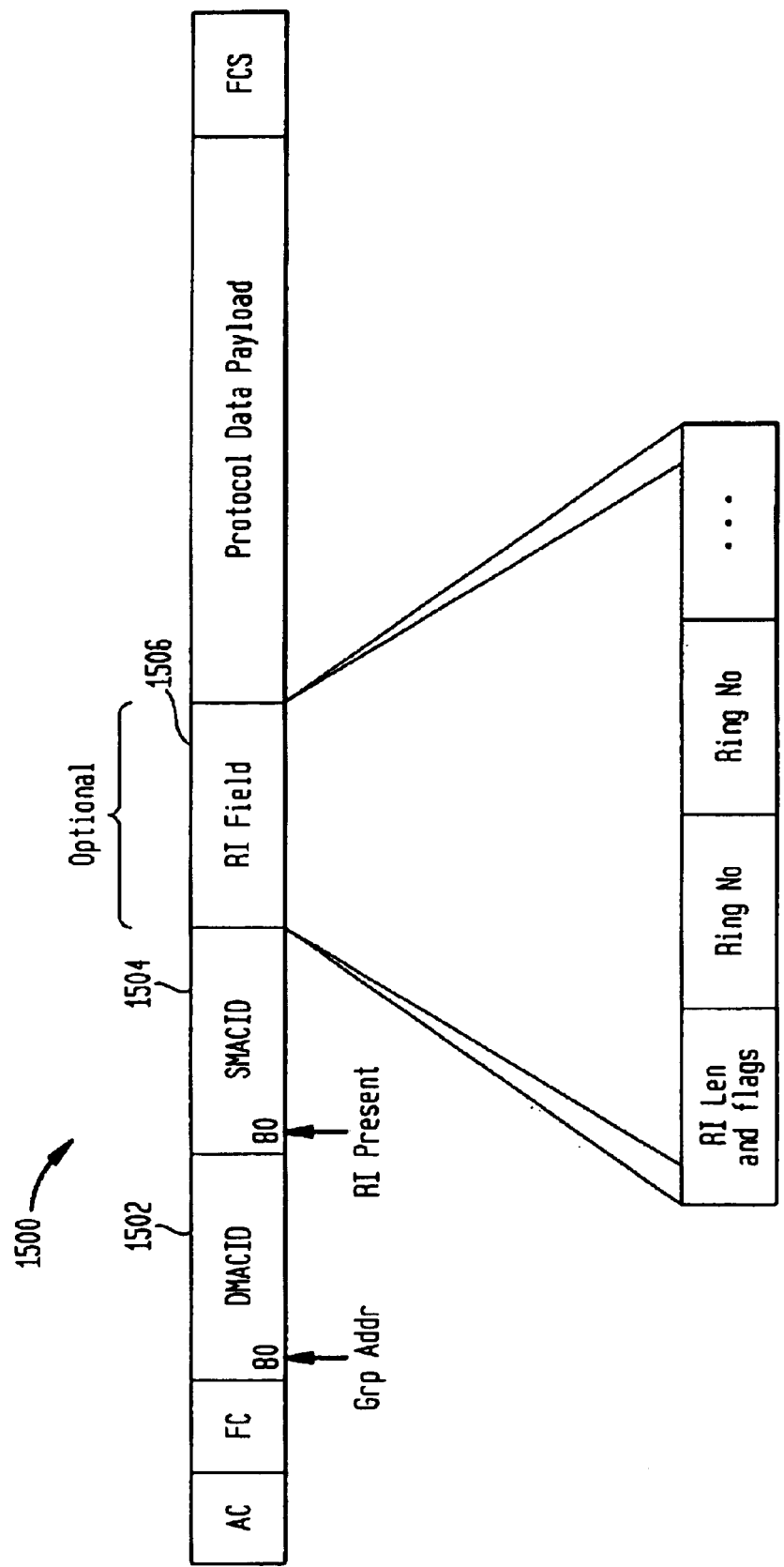
FIG. 15 illustrates a Token Ring LAN frame, which depicts the fields in the frame.

An example of the simulator according to the first embodiment of the present invention is now described herein for a Token Ring LAN architecture. FIG. 15 depicts a Token Ring LAN frame 1500, having the fields including the destination MACID ("DMACID") 1502, the source MACID ("SMACID) 1504 and the routing information ("RI") field 1506.

Sending data from multiple virtual clients does not represent a problem because the LAN device only requires that a complete LAN frame be constructed and passed to it as an entity for transmission on the LAN. More specifically, the LAN device does not check the SMACID 1504 address field to ensure that it matches the MACID, which would be required if the same device were to receive return traffic. Thus, the simulating system can formulate complete LAN frames that originate from multiple clients and simply pass them to the LAN device for transmission. These LAN frames are inserted onto the LAN and routed to the system under test without any special action by the simulating system.

The Token Ring LAN architecture implements a protocol specifying that the LAN device must copy LAN frames from the LAN into the connected machine when the DMACID 1502 address field matches the address of the LAN device. The frame is then passed up the protocol stack and ultimately to the consuming application. If this mechanism were used in a simulating machine, traffic for virtual clients could be transmitted to the system under test, but the return traffic from the system under test would not be copied from the LAN and would be lost. However, as the Token Ring architecture supports bridging, LAN frames at layer 2 of the protocol stack may be copied from one LAN segment to another.

Figure 17:
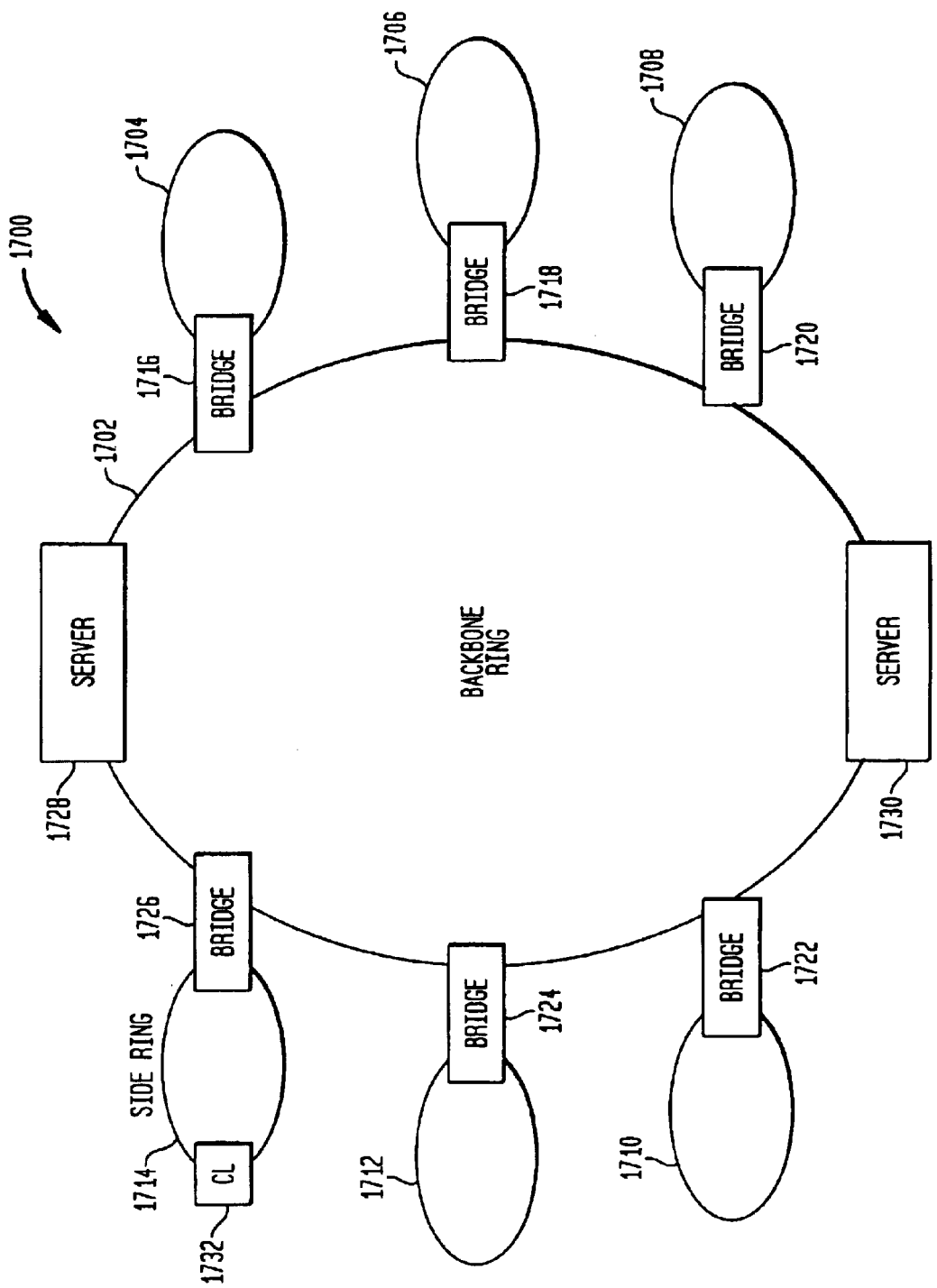
FIG. 17 depicts a typical Token Ring LAN segment layout.

FIG. 17 depicts a typical Token Ring LAN segment layout 1700. The layout consists of a backbone ring 1702 and several numbered side rings 1704, 1706, . . . ,1714. The bride machines containing LAN devices according to the present invention 1716, 1718, . . . ,1726, span the side rings and are attached to the backbone ring 1702. Each of the rings is numbered. Thus, given two ring numbers, i.e., the backbone ring number and the side ring number, the connection between the rings is determined. In a typical scenario, a serving system 1728, 1730 will reside on the backbone ring 1702, while the clients 1732 reside on the side rings 1704, . . . , 1714. This configuration allows differing speeds and/or equipment in these two areas. The backbone ring 1702 is generally high speed and high capacity, and may even consist of multiple connections. The side rings are smaller and handle a plurality of clients 1732. The bridges 1716, . . . ,1726, act as filters, passing only traffic which is necessary between the backbone and the side rings. Because the bridging addressed in the present invention takes place at level 2 of the protocol stack, it is invisible to the upper layers of the protocol. For example, TCP/IP does not know whether the LAN is bridged or not.

As mentioned, the Token Ring LAN architecture enables the bridging of LAN segments, particularly by copying the LAN frame from the LAN into a connected bridge machine (i.e., LAN device) based on the contents of the RI field 1506 (FIG. 15) and not based upon the DMACID 1502. More specifically, the LAN device knows the two ring numbers that are being connected, and when these two ring numbers appear consecutively in the RI field, the LAN device will copy the frame. A bridge machine protocol stack does not extend higher than level 2. The computer code running on this machine simply transfers the frames received on one interface to an output queue of the other interface, while monitoring and filtering unnecessary traffic.

Figure 14:
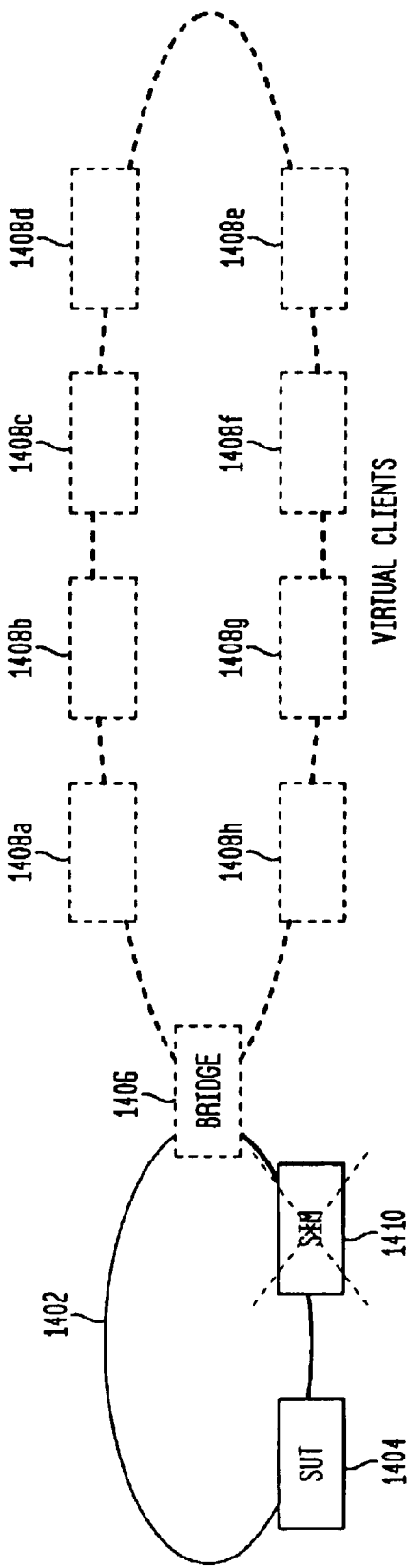
FIG. 14 illustrates a system under test that is connected to a backbone ring, which in turn is connected a simulating machine simulating machine, which houses a bridge and facilitates a plurality of simulated clients.

FIG. 14 depicts a system under test ("SUT") 1404 connected to a backbone ring 1402, which in turn is connected to a simulating machine ("SIM") 1410, which includes the split bridge device 1406 and facilitates simulation of a plurality of clients 1408*a*, . . . ,1408*h* comprising a simulated LAN 1412. When outbound LAN frames are created by the simulating machine 1410, their RI field contains the ring number of the actual LAN 1402 attached to the bridge as well as a virtual ring number, i.e., the ring number of the simulated LAN 1412. The LAN frames from the simulated clients normally contain routing information for the actual LAN connecting the simulation machine to the system under test, as well as routing information for the simulated LAN. Thus, to the system under test 1404, the virtual clients appear to be on a separate LAN residing behind the bridge. However, in fact, these clients do not exist and the traffic is sourced and absorbed by the simulating machine. Thus, the simulating machine 1410 effectively splits a bridge. That is, half of the SIM, i.e., the half that is presented to the real LAN device, looks like the bridge, and the other half of the bridge refers to a simulated LAN and comprises the SIM 1410, which executes bridging code required to support virtual bridging. That is, the SIM code responds to broadcast requests by simulated clients that pass through the bridge by inserting real and virtual ring numbers into the frames. Referring to FIG. 15, the routing information 1506 of broadcast packets received by the split bridge from either interface will not contain the ring number pair of the split bridge. This ring number pair will be inserted into the packet prior to transmission on the other interface. All bridges perform this operation on broadcast packets. Thus, the split bridge must perform this function as well in order to support the bridging protocol. Upon receiving the client requests, the system under test broadcasts replies to the virtual clients. The simulating machine bridge absorbs these replies and transfers them directly to the simulating machine protocol stack. The actual client address DMACID may be used if necessary to establish the client context within the simulating machine.

Alternatively, as mentioned the present invention applies to a switch device, for LAN types that do not support bridges, such as the ATM network architecture to effect client virtualization. The ATM network architecture implements LAN devices called switches, which operate at level 2 of the protocol stack to switch traffic between various network endpoints. Therefore, to effect the required client virtualization, the simulation LAN device is configured as a switch. The computer code driving the LAN device supports the virtual path setup and teardown required to establish ATM virtual circuits. Again, the driving code would be altered to redirect one of the interfaces to the simulating system in essentially the same way as the split bridge device. Once this is accomplished, traffic can be easily passed between the system under test and the simulator. ATM architecture supports various encapsulated LAN architectures, such as Token Ring and Ethernet. Because ATM architecture supports various encapsulated LAN architectures as well as native ATM protocols, one or more ATM Adaptation Layers (AALs) may be required, one for each frame type. The functions of these layers are well defined by the ATM forum and require insignificant modification to support a plurality of client contexts required by the level 2 simulator. Thus, once the encapsulated frames are assembled, they can be fed into higher level protocols as native Ethernet or Token Ring frames.

Additionally, the present invention also supports client virtualization utilizing Ethernet network architecture.

Figure 13:
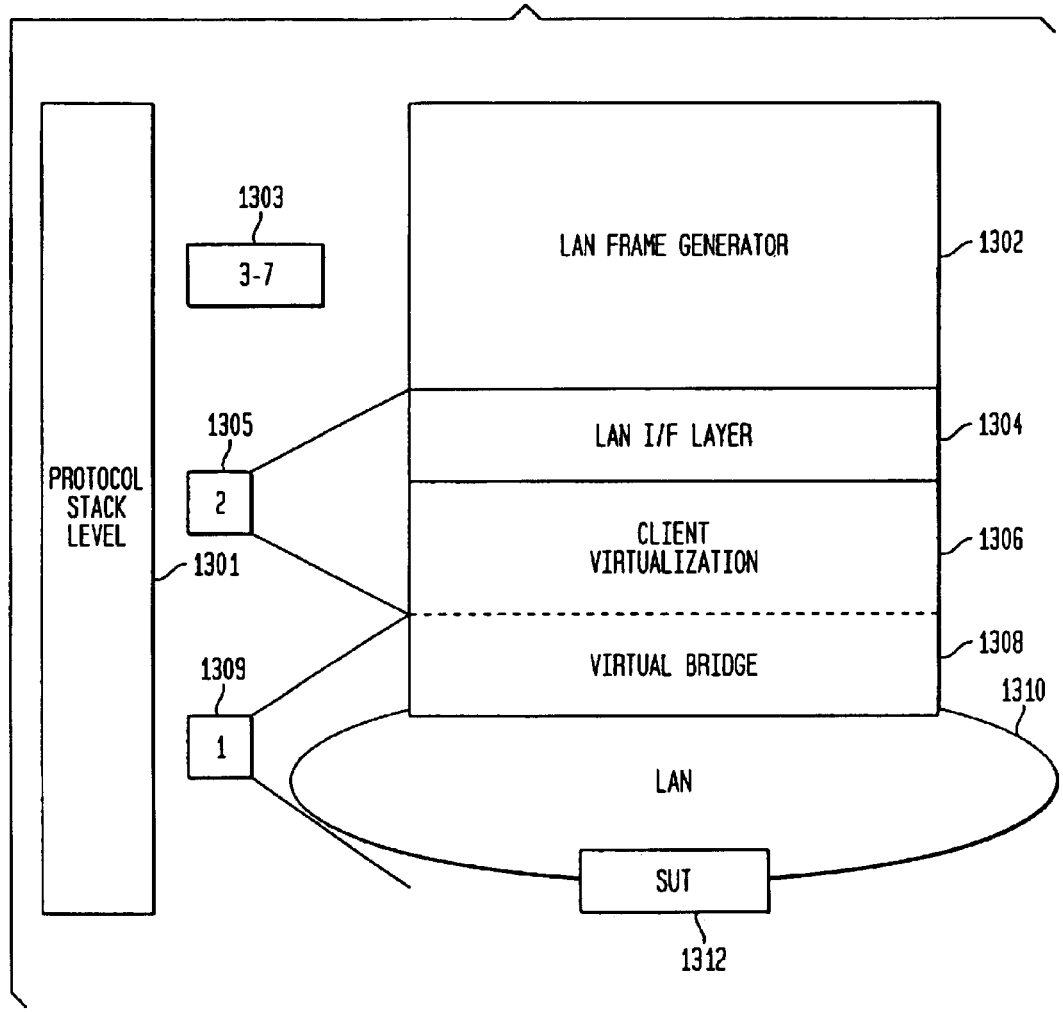
FIG. 13 is a diagram illustrating mechanisms involved in client virtualization utilizing Ethernet architecture.

Ethernet network architecture, which supports neither bridges nor switches, provides a promiscuous mode that allows all traffic on the LAN to be retrieved. FIG. 13 illustrates a model 1300 that can be used for Ethernet architecture. Once, traffic is retrieved from the LAN 1310, the I/F layer 1304 has the responsibility for filtering out all traffic that is not intended for the virtual clients. This operation is required for Ethernet because no mechanism exists in the Ethernet protocol to extend the client address (with routing information) such as exists in Token Ring. Thus, due to the absence of this mechanism, the Ethernet hardware cannot distinguish between traffic intended for a virtual client and other traffic on the LAN. (Token ring did this with the routing information for the split bridge.) Since Ethernet LAN interface hardware cannot do this filtering, the I/F (LAN Interface) layer will receive ALL traffic from the LAN—even those frames not intended for a simulated client. Therefore, it is up to the I/F layer (that part of protocol stack layer 2 which is the interface to layer 1) to discard the extra packets. (For Token Ring, the LAN card does this.)

While the preferred embodiment of the present invention has been described with respect to the Token Ring architecture, the same methodology pertains to any LAN architecture that supports the transferring of frames from one LAN segment to another LAN segment at level 2 in the protocol stack. Similarly, this methodology could also support simulation at level 3 in the protocol stack, e.g., a router. Instead of having unique MACIDs in the frames of the virtual clients, as would be the case in simulation at level 2 in the stack, the frames would have identical MACIDs but unique protocol level addresses. That is, all of the MACIDs would be identical, representing the MACID of the router, but the IP addresses would be unique. Depending upon the application being driven this could be desirable or not desirable. For example, a mail server, which primarily serves users that are local to the enterprise and, thus, local to the LAN, tends to receive traffic at level 2. Each LAN frame will have a unique MACID and a unique TCP/IP address that corresponds to the MACID. In this case, the simulation at level 3 is not desirable because fidelity to real traffic would be compromised. Other applications, such as Web servers, primarily serve users that are foreign to the enterprise, and thus, not attached to the LAN but who have come into the LAN through a router attached to a wide area network. These servers tend to receive traffic at level 3, i.e., each LAN frame has a unique TCP/IP address that corresponds to the client but the MACID is the same in all of the frames, i.e., the MACID of the router. In this case, simulating at level 3 would be acceptable and would preserve the fidelity to real traffic, which is desired.

In the preferred embodiment of the present invention, it is possible to have multiple routes from a client to a server, since each address is unique because each has different routing information. Generally, both client and server usually discard any duplicate routes, keeping the first reply received for use in subsequent transmissions. However, there are instances in which a server can employ the various routes to achieve load balancing. Load balancing generally refers to techniques that distribute work across multiple parallel servers, herein referred to as a composite server, to handle peaks occurring in the load or traffic. The split bridge of the present invention may also be employed with systems utilizing load balancing when handling peaks in load or traffic.

Each route to the server can be viewed as a separate port to the server. For example, the Token Ring architecture uses the routing information field not to address clients but to locate clients. Thus, the RI field is not considered a part of the client address. Hence, it is possible to have identical client addresses (e.g., MACIDs) on different rings, that is, identical client addresses with different routing information. While this practice is not recommended because client addresses should be unique, it is particularly allowed in this architecture type. This capability can be exploited for other uses beyond client virtualization, such a load balancing. Exploiting this architecture enables the scaling of servers to handle larger volumes of traffic.

Figure 12:
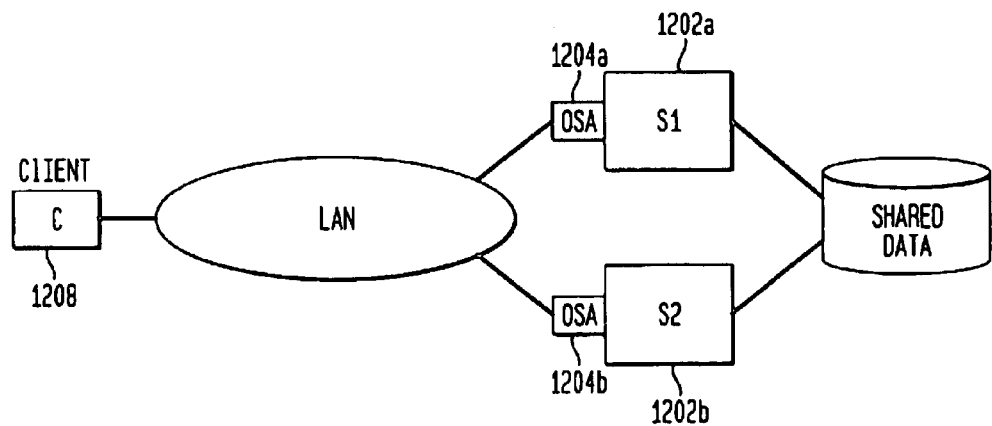
FIG. 12 is a diagram showing an embodiment of the present invention illustrating a split bridge operation combined with load balancing feature.

FIG. 12 is a diagram showing an embodiment of the present invention illustrating a split bridge operation combined with a load balancing feature. Servers S1 1202a and S2 1202b both provide server functions that handle requests from Client C 1208. Each Open System Adapter (OSA) 1204a, 1204b is configured as a split bridge.

Consequently, each OSA 1204a, 1204b copies traffic based upon routing information as well as traffic specifically directed to that OSA's MACID. When service is requested by client C 1208, the request can be satisfied by one of the servers S1 1201a or S2 1202b. For example, the client 1208 broadcasts a request to find the hardware address of the server given the server protocol specific address. An example is an address resolution protocol (ARP) request. Briefly, an ARP request is used to match an IP address with a hardware address MACID. The IP address is placed in the request and the request is broadcast on the LAN.

Since the client's request is a broadcast, both OSAs 1204a, 1204b copy the request. In a normal situation, both would reply and create a race. However, in load balancing, one OSA 1204a is designated primary and pass the request without delay. The other OSA 1204b is designated secondary and delays the request for a fixed amount of time. In this way, the reply from the preferred server 1202a which may change from time to time will have an advantage in the race and will with high probability be biased by the delay value and arrive at the client 1208 first.

Each reply has a unique address since the routing information is different for the two OSAs 1204a, 1204b. The client 1208 receives and keeps the first reply. Subsequent replies are discarded. Using the save information related to the first server's route, subsequent traffic is directed to the first replying server 1202a via the routing information received in the broadcast reply. In the event that the primary server 1202a has gone down, any other functioning server that is up eventually replies. Thus, as long as one functioning server remains, a connection can be made. Systems such as SYSPLEX have ability to control the "primary server" designation in a way that reflects the relative availability of processing capacity. Therefore, the split bridge operation of the present invention may easily be adapted to load balancing across the servers.

Figure 16:
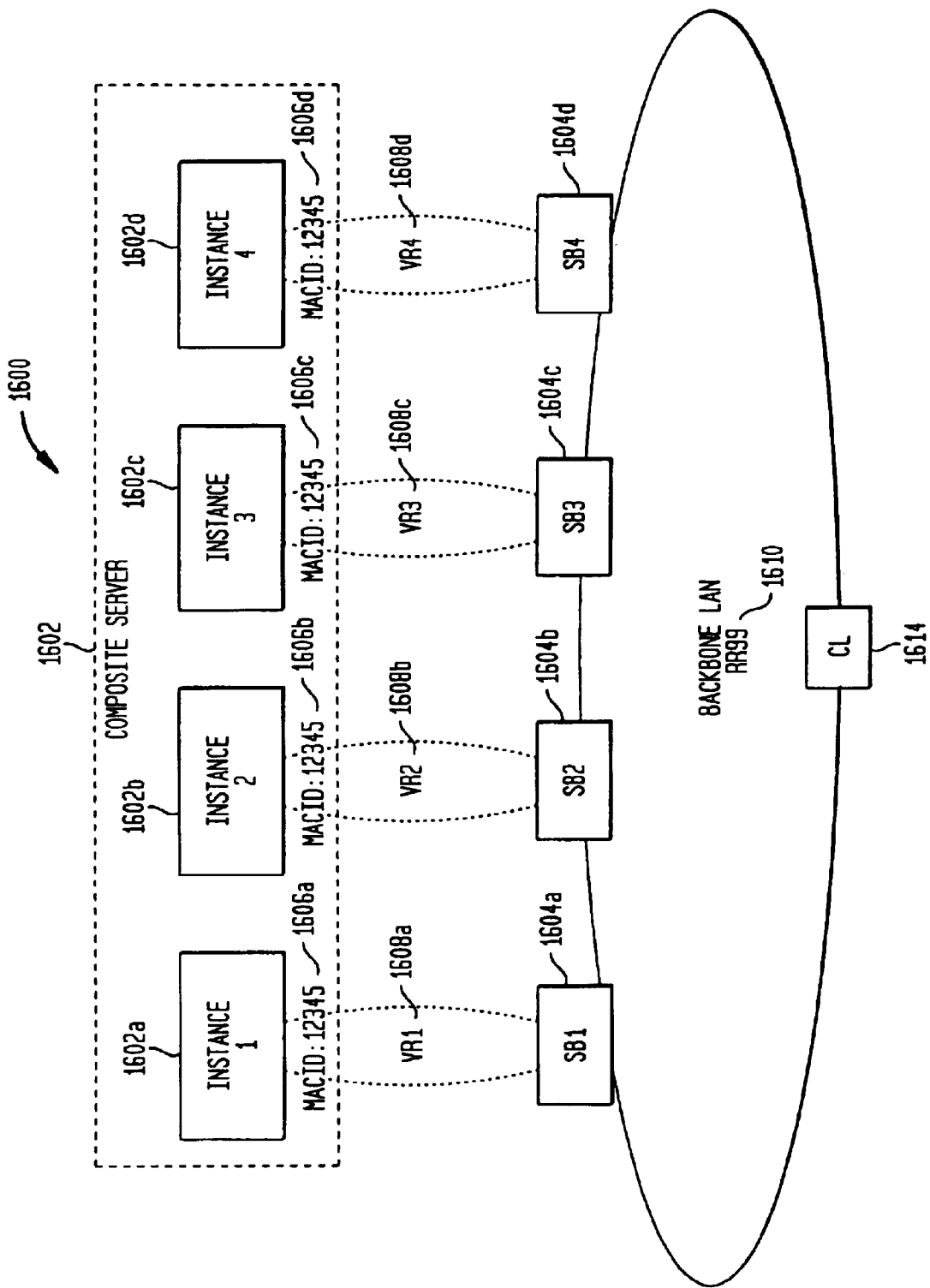
FIG. 16 depicts an exemplary composite server, which is comprised of instances of parallel servers.

FIG. 16 depicts an exemplary composite server 1602, comprising two or more instances of parallel servers, e.g., 1602(a)–(d), wherein each parallel server is connected to a backbone LAN 1612 on which a client computer 1614 resides via a split bridge device 1604(a)–(d), respectively. However, splitting the workload among separate physical servers in a composite server, causes problems with addressing. More specifically, when the client attempts to attach to the composite server, a problem arises as to which server is to be selected and how it is to be selected.

The aforementioned composite-server addressing problem is solved by using a split bridge of the present invention. In this scenario, the routing information field is a logical extension of the addressing information. That is, the composite server is set up with a single client address (MACID) 1606(a)–(d), where every instance of the composite server 1602(a)–(d) presents the same client address. However, each server presents this client address with different routing information. Because the routing information can be discovered when the route is formed, a single client address will suffice to address multiple instances of that client, with routing information specifying the specific instance. This requires that, during client connection attempts, the composite server determines which instance is to accept the connection. This instance is instructed to respond to the connection request, supplying the routing information that makes the instance unique. The client, having discovered the route to the server, then uses the routing information in all subsequent transmissions. Thus, the composite server can balance the load among the various instances of the composite server by judiciously selecting which instance will respond to the client connection request. All instances of the composite server 1602 present the same client address, e.g., "12345" 1606(a)–(d). However, the route of the various instance is different. For example, each instance 1602(a)–(d) is addressed as client 1606(a)–(d) with routing information 1610 coupled with 1608(a)–(d). Thus depending upon which instance responds first to the route discovery request, that instance of the composite server will be loaded. If the composite server monitors the overall load and directs the various instances to respond or to delay, overall long-term balancing can be achieved.

While the aforementioned load balancing is described with regard to Token Ring architecture, load balancing can be accomplished on any LAN architecture that supports the transfer of frames between LAN segments at level 2 of the protocol stack, including FDDI and ATM architectures. However, as previously stated, Ethernet only supports promiscuous mode that simply copies all traffic on the LAN into a connected system. Because Ethernet provides no way to extend the client addressing (via routing information), Ethernet cannot support load balancing utilizing the technology of this invention.

Moreover, the split bridging implemented for load balancing can be enabled even if the location is referenced by hardware address rather than the protocol specific address. Thus, using the split bridge technology, servers can have the same protocol specific and/or hardware specific address and still balance load at a session establishment level by utilizing the split bridging technique of the present invention.

Additionally, given the ability to insert LAN frames transparently onto a LAN, it is easy to build tools that build specific LAN frames and place them onto the LAN. For example, a "flood ARP" tool may be utilized. This is program, which receives a list of IP addresses and runs sequentially down the list to build an ARP frame for each of the source IP addresses sent to a designated server using the LAN insertion code. The tool creates an effect, which to a server appears as if hundreds of clients had requested for the ARP. The "flood ARP" is an example of a test tool for exercising LAN cards by having multiple real clients sending the ARPS. Each of these requests is recorded in the server ARP table. Thus, this simple tool provides an easy method for testing ARP cache handling.

While the invention has been particularly shown and described with respect to a preferred embodiment thereof, it will be understood by those skilled in the art that the foregoing and other changes in form and details may be made therein without departing from the spirit and scope of the invention.

Having thus described our invention, what I claim as new, and desire to secure by Letters Patent is:

1. A simulator for inserting simulated network frames onto a physical medium for delivery to a system under test over a network, comprising:

a bridge device having a network interface card for communicating with the network;

the bridge device including first and second interfaces; and a frame generator, coupled to the bridge device via the first interface, for generating at least one simulated network frame from each of multiple virtual clients according to a specific network communications protocol; wherein:

the bridge device transfers, via the second interface, the at least one simulated network frame from each of the multiple virtual clients from the frame generator to the system under test via the network to simulate traffic of the multiple virtual clients;

for each of the multiple virtual clients, a unique identifier combined with bridging information is associated with the at least one simulated network frame; and the bridge device receives one or more network frames from the system under test via the network in reply to the simulated network frames transferred thereto; and the bridge device operates at a data link layer in a protocol stack.

2. The simulator of claim 1, wherein the frame generator is coupled to the bridge device via a channel connection.

3. The simulator of claim 1, wherein the fame generator is coupled to the bridge device via an Open System Adapter connection.

4. A simulator enabling insertion of simulated network frames onto a physical medium for delivery to a system under test implementing one or more servers to achieve load balancing across a network, comprising:

a plurality of bridge devices, each having a network interface card, and each connected to a respective one of the one or more servers employed for load balancing and enabled to communicate via its respective network interface card with the network; wherein:

one of the plurality of bridge devices is designated as a primary bridge device for passing a received broadcast message, without delay, to the restive one of the one or more servers, via its respective network interface card, and another of the plurality of bridge devices is designated as a secondary bridge device for passing the received broadcast message, with a predetermined delay, to the respective one of the one or more serves, via its respective network interface card;

subsequent messages are sent only to the primary bridge device; and the bridge devices operate at a data link layer in a protocol stack.

5. A method for inserting simulated network frames onto a physical medium for delivery to a system under test, comprising:

connecting a bridge device with a network interface card having a unique identifier to a network;

receiving simulated network frames from a frame generator coupled to the bridge device;

configuring bridging information in the bridge device to include identifies associated with the simulated network frames, the identifies emulating identifiers of a plurality of client workstations; and forwarding the simulated network frames onto the network via the network interface card;

wherein the bridge device operates at a data link layer in a protocol stack.

6. The method of claim 5, further comprising:

receiving network frames representing replies from a server designated for the plurality of client workstations based on the configured bridging information, wherein the received network frames have unique frame identifiers representing the plurality of client workstations.

7. A method for inserting simulated network frames onto a physical medium for delivery to a system under test implementing one or more servers to achieve load balancing, comprising:

connecting a bridge device for each server in a load balancing system having a plurality of servers;

a primary of the bridge devices transmitting a client request immediately to a first server connected to the primary bridge device;

a secondary of the bridge devices transmitting the client request after a predetermined amount of time to a second server connected to the secondary bridge device; and transmitting subsequent client requests to the primary bridge device.

8. A program storage device readable by machine, tangibly embodying a program of instructions executable by the machine to perform a method for inserting network frames onto a physical medium for delivery to a system under test, the method comprising:

connecting a bridge device with a network interface card having a unique identifier to a network;

receiving simulated network frames from a frame generator coupled to the bridge device;

configuring bridging information in the bridge device to include identifiers associated with the simulated network frames, the identifiers emulating identifiers of a plurality of client workstations; and forwarding the received simulated network frames onto the network via the network interface card;

wherein the bridge device operates at a data link layer in a protocol stack.

9. The program storage device of claim 8, wherein the method further includes:

receiving network frames representing replies from a server designated for the plurality of client workstations based on the configured bridging information, wherein the received network frames have unique frame identifiers representing the plurality of client workstations.

10. The simulator of claim 1, wherein:

the bridge device operates at a data link layer in a protocol stack.

11. The simulator of claim 4, wherein:

the bridge devices operate at a data link layer in a protocol stack.

12. The method of claim 5, wherein:

the bridge device operates at a data link layer in a protocol stack.

13. The program storage device of claim 8, wherein:

the bridge device operates at a data link layer in a protocol stack.

14. The simulator of claim 1, wherein:

for each of the multiple virtual clients, the unique identifier comprises a data link layer identifier.

15. The method of claim 5, wherein:

the identifiers associated with the simulated network frames comprises data link layer identifiers.

16. The program storage device of claim 8, wherein the identifiers associated with the simulated network frames comprises data link layer identifiers.

* * * * *